US006832370B1

(12) United States Patent
Srinivasan et al.

(10) Patent No.: US 6,832,370 B1
(45) Date of Patent: Dec. 14, 2004

(54) DATA SPECULATION WITHIN MODULO SCHEDULED LOOPS

(75) Inventors: Uma Srinivasan, Sunnyvale, CA (US); Kevin Nomura, San Jose, CA (US); Dz-ching Ju, Sunnyvale, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 0 days.

(21) Appl. No.: 09/566,990

(22) Filed: May 9, 2000

(51) Int. Cl.[7] .............................................. G06F 9/45
(52) U.S. Cl. ...................................... 717/161; 712/241
(58) Field of Search ................................ 717/159, 160, 717/161; 712/241

(56) References Cited

U.S. PATENT DOCUMENTS

| | | | | |
|---|---|---|---|---|
| 5,491,823 A | | 2/1996 | Ruttenberg | 395/700 |
| 5,729,723 A | | 3/1998 | Wada et al. | 395/563 |
| 5,764,962 A | * | 6/1998 | Buzbee | 703/23 |
| 5,781,752 A | | 7/1998 | Moshovos et al. | 395/392 |
| 5,794,029 A | | 8/1998 | Babaian et al. | 395/588 |
| 5,802,337 A | * | 9/1998 | Fielden | 712/216 |
| 5,835,776 A | | 11/1998 | Tirumalai et al. | 395/709 |
| 5,867,711 A | * | 2/1999 | Subramanian et al. | 717/161 |
| 6,230,317 B1 | * | 5/2001 | Wu | 717/161 |
| 6,260,190 B1 | * | 7/2001 | Ju | 717/156 |

OTHER PUBLICATIONS

Vinod Kathail, et al., "HPL–PD Architecture Specification: Version 1.1," Feb. 2000, Hewlett–Packard Co., HPL–93–80 (R.1), pp. 1–58.*
Michael S. Schlansker, et al., "Achieving High Levels of Instruction–Level Parallelism with Reduced Hardware Complexity," 1994, Hewlett–Packard Co., HPL–96–120, pp. 1–85.*
Mahadevan, Uma, et al., "Applying data speculation in modulo scheduled loops", Copyright 2000, IEEE, p.p. 169–176, Hewlett–Packard Company.

* cited by examiner

Primary Examiner—Todd Ingberg
Assistant Examiner—Eric B. Kiss

(57) ABSTRACT

Optimizing compiler performance by applying data speculation within modulo scheduled loops to achieve a higher degree of instruction-level parallelism. The compiler locates a schedule for specifying an order of execution of the instructions and allocates rotating registers for the instruction execution. Based upon the schedule and the register allocation, the compiler determines an initiation interval specifying a number of instruction issue cycles between initiation of successive iterations related to the scheduling of the instructions.

26 Claims, 7 Drawing Sheets

DATA SPECULATION WITHIN MODULO SCHEDULED LOOPS

FIELD OF THE INVENTION

The present invention relates to an apparatus and method for using a compiler in a computer system to perform data speculation within modulo scheduled loops.

BACKGROUND OF THE INVENTION

In software program compilers, it is desirable to increase the efficiency of the compiler. Two different methods of optimizing compiler performance include data speculation and use of a modulo scheduler. However, these methods operate independent of one another and thus do not gain the benefit of combining them. In particular, in the absence of a solution such as the data speculation, the modulo scheduler must make conservative assumptions with respect to memory dependencies, which reduces the efficiency of the scheduled code.

On the other hand, in the absence of modulo scheduling, data speculation within loops must rely upon techniques such as unrolling with acyclic scheduling to exploit instruction-level parallelism (ILP) across iterations. With this technique, however, the unroll factor required to achieve the same amount of overlap as modulo scheduling is difficult to determine. Also, unrolling can have undesirable side effects such excessive code expansion and negative cache performance.

Accordingly, a need exists for an apparatus method to perform data speculation within modulo scheduled loops.

SUMMARY OF THE INVENTION

An apparatus and method consistent with the present invention schedule instructions in a compiler. They include receiving instructions for scheduling along with data speculation code. They also include locating a schedule for specifying an order of execution of the instructions, generating recovery code for the data speculation code, and allocating rotating registers related to the scheduling of the instructions for execution and related to the recovery code. Based upon the locating and allocating, an initiation interval is determined specifying a number of instruction issue cycles between initiation of successive iterations related to the scheduling of the instructions.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Introduction

Figure 1:
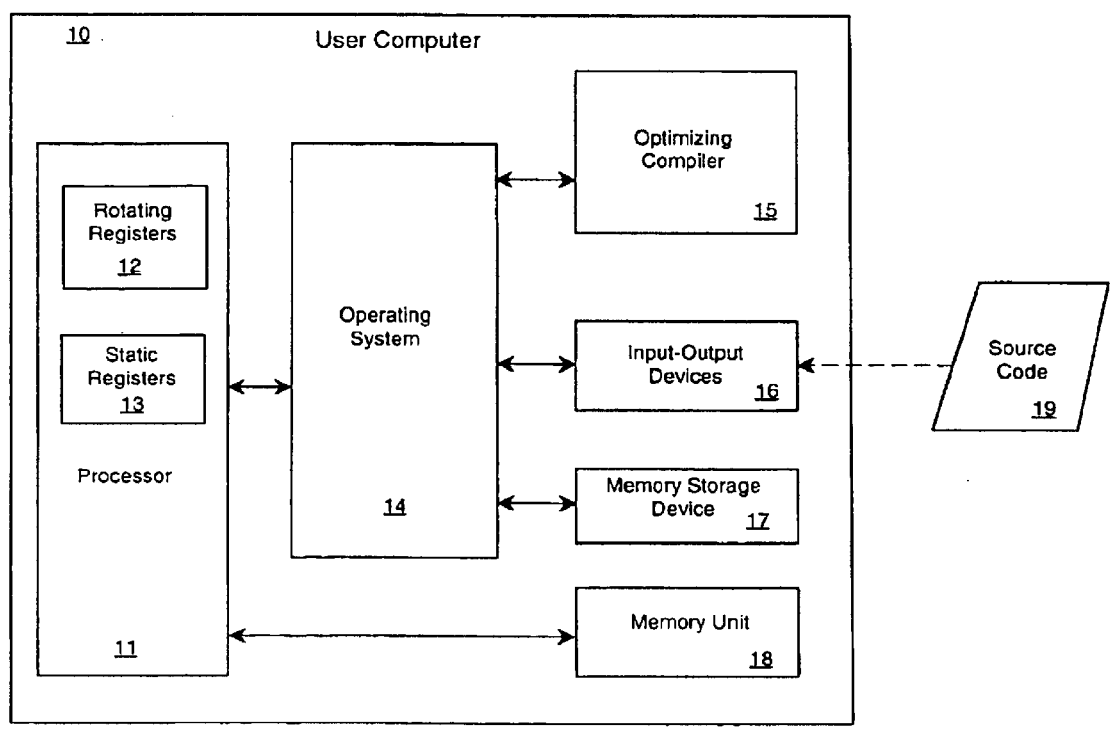
FIG. 1 is a block diagram of an exemplary computer architecture to implement data speculation within modulo scheduled loops in a compiler consistent with the present invention.

Modulo scheduling is an instruction scheduling technique for loops geared towards achieving high degrees of instruction level parallelism. This technique has demonstrated benefits for loop-intensive application programs. The basic idea of this technique is to find the lowest initiation interval (II) at which a valid schedule can be produced for launching overlapped iterations of a loop in a computer program.

The validity and efficiency of a schedule is determined by both the dependence constraints in the source program and resource constraints in the underlying machine. Many of the dependence constraints are due to memory dependencies. The modulo scheduler must disambiguate such references across loop iterations and provide exact dependence distances where possible but, in the absence of hardware support, conservative assumptions must be made regarding aliased memory references. Data speculation based on a collaborative hardware and software approach provides the scheduler with freedom to speculatively schedule an instruction with potentially incorrect operand values, while ensuring program correctness with the capability of re-executing the speculated instructions when a mis-speculation occurs.

An exemplary embodiment can be implemented in an underlying architecture similar to the IA-64 architecture. This architecture has support for explicit parallelism, data speculation with a runtime memory disambiguation mechanism, rotating registers and other support for kernel-only modulo scheduling, and predicated execution. The compiler generates special instructions called BRDVs which are paired with data speculative loads to validate the speculation and branch to recovery code in the event of a mis-speculation. In addition it generates recovery code to re-execute speculated instructions with the correct values.

In order to speculate load instructions within a modulo scheduled loop, the modulo scheduler needs to generate corresponding BRDV instructions. Unlike a list scheduling algorithm, the modulo scheduling algorithm, being iterative, does not actually commit to the speculation of instructions until a valid schedule has been found. This presents a challenge for the modulo scheduler to reduce the recurrence constraint (RecMII) by enabling speculative loads, while avoiding a detrimental increase in the resource constraint (ResMII) from the corresponding BRDVs which are inserted.

The modulo scheduling phase needs to ensure full recoverability for all speculated instructions, which may span multiple loop iterations or be speculatively executed more than once. In general, identifying the speculated instructions in a modulo schedule requires intricate use of the modulo reservation table to reconstruct the actual execution order. Finally, for a register, such as the base register of a post-increment load instruction, whose value is both used and overwritten by a speculated instruction, a complex sequence of instructions is generated to recover its value.

The rotating register assignment phase must be extended to color instructions in recovery code, whose current stage is different from the stage of the corresponding speculated instruction. This is further complicated by instructions which need to be recovered multiple times in recovery code.

An embodiment consistent with the present invention incorporates speculation with full support for recovery code generation and rotating register assignment in a modulo scheduler.

Architectural Support

The underlying architecture to implement an exemplary embodiment can be the VLIW-based HPL PlayDoh architecture or the IA-64 architecture, both of which are known in the art and support wide execution units, predicated execution, rotating registers, and data speculation with a run-time memory disambiguation mechanism. An exemplary architecture is illustrated in FIG. 1. This architecture includes a user computer 10 having a processor 11 for executing software applications. An operating system 14 controls operation of processor 11 and interacts with an optimizing compiler 15, input-output devices 16, and a memory storage device 17. Input-output devices 16 can receive source code 19 to be compiled by optimizing compiler 15. Processor 11 can also include rotating registers 12 and static registers 13 for use by optimizing compiler 15 as explained below. Processor 11 can also communicate directly with a memory unit 18.

This architecture supports a general form of predicated execution, which refers to the conditional execution of instructions based on a boolean-valued source operand, called a predicate. It is a way to enforce the semantics of program control flow, which is different from the one provided by branch operations. A compiler can use predicated execution to eliminate many of the conditional branches in a program, and this process is called if-conversion. To support predicated execution, the architecture provides 1-bit predicate register files and a class of compare-to-predicate instructions which set predicate registers. Most instructions have a predicate input to guard their execution.

The architecture supports both static and rotating registers 12 and 13. Most register files, including integer, floating-point, and predicate registers, are partitioned into static and rotating portions. Static registers 13 are conventional registers, and rotating registers 12 logically shift in register address space every time the rotating register base (RRB) is decremented by certain loop closing branches, such as BRF for counted loops and BRW for loops with exits, to support modulo scheduling of loops. The semantics of these branch instructions and how they are used in various code schemas for modulo scheduling of loops is know in the art. Typically, the access of a rotating register involves the modulo sum of the register offset to RRB in order to select a physical register. Consider a register file R with $n_r$ number of rotating registers, R[0] . . . R[$n_r$-1]. Assume that x is the value contained in some register R[j] prior to a "rotate" operation (e.g. BRF or BRW), and after a rotate operation R[j+1] has value x, where $0<=j<=n_r-2$. The combined support of rotating registers and predicated execution permits the generation of tight code for modulo scheduled loops, since the ramp up, steady state, and ramp down phases of the loop execution are all effected with the same kernel code.

The architectural support for data speculation to exceed the limit of memory dependences on the architecture includes the following instructions: LDS (a data speculative load), LDV (a data verify load), and BRDV (data verify branch). LDS is similar to a normal load instruction but also stores the destination register and the memory address into an entry in a log of memory references. LDV checks to see if there is a valid entry whose target register field is identical to the destination register specified in the LDV instruction. An intervening store to the same memory address as specified by the LDV will invalidate this entry. If the entry is invalid, LDV will load the value from memory again. BRDV also checks the entry set by a LDS and will trigger an interrupt or a branch to invoke recovery code if the entry is invalid. In addition, there is a way to mark an entry in the log as valid or invalid. This run-time disambiguation mechanism permits efficient code generation in cases where the compile-time analysis fails. In particular, this allows a scheduling phase to aggressively move a load across one or multiple aliasing stores.

Overview of Modulo Scheduling Compiler Framework

An acyclic scheduling (or list scheduling) phase builds a dependence acyclic graph (DAG) based on the data and control dependences in the loop body and then performs instruction scheduling based on this DAG. The DAG is passed to the modulo scheduling phase to build an MS graph by with additional edges from dependences across iterations. These cross-iteration edges, which are also called recurrence edges, record the number of iterations that the incurred dependence spans across as their omega values. Based on the MS graph, the system computes the initiation interval (II), which is the number of instruction issue cycles between the initiation of successive iterations. The lower bound of an II is the maximum of ResMinII and RecMinII, where ResMinII is derived from the resource usage requirements of the graph and RecMinII is derived from latency calculations around the circles defining recurrences within the graph. For a given II starting from the lower bound, the modulo scheduling phase attempts to find a schedule, and if successful the modulo scheduled loop body is passed to rotating register allocation phase. The allocator attempts to assign registers to lifetimes in the modulo scheduled loop based on the binpacking "best-fit" algorithm known in the art. If either a schedule is not found or a register assignment is not found (such as in the case of insufficient rotating registers), the process restarts with an increased II. The process is terminated by either finding a legal schedule and register allocation or by exhausting all ITs smaller than the path length obtained from acyclic scheduling the same loop body.

TABLE 1

| Loop: | 1d x = [a], 4 | // I1; a is post-incremented by 4. |
|---|---|---|
| | add y = x, b | // I2 |
| | 1d z = [y] | // I3 |
| | add w = z, c | // I4 |
| | 1d u = [w] | // I5 |
| | st [d] = u, 4 | // I6; d is post-incremented by 4. |
| | br1c Loop | // I7; branch on loop count; |

Figure 2:
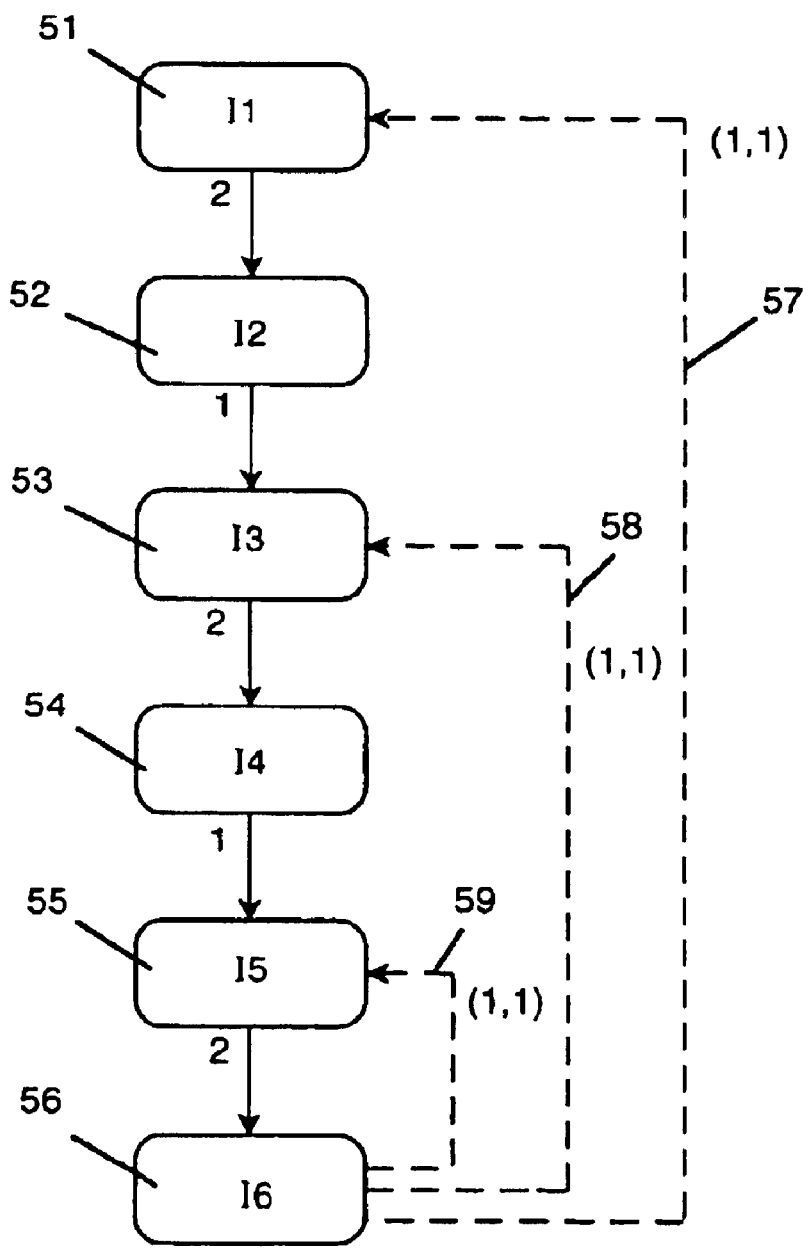
FIG. 2 is a diagram of a DAG and an MS graph.

Table 1 and FIG. 2 provide an example for a loop body, which contains 7 instructions I1 (51), I2 (52), I3 (53), I4 (54), I5 (55), and I6 (56), with the last instruction a branch on loop count. Instructions I1 through I6 have a sequence of dependencies. FIG. 2 without the dotted lines is the corresponding DAG, and each edge is marked with its latency, where it is assumed that a load has a 2-cycle latency and all other instructions have a 1-cycle latency. An acyclic scheduling will schedule the 6 instructions in 9 cycles. The corresponding MS graph is constructed by adding recurrence edges shown as dotted lines 57, 58, and 59 from the store (I6) to the loads (I1, I3, and I5) in the next iteration. Each recurrence edge is marked with a pair of values, (omega, latency), where omega is the dependence distance in the iteration space and latency is the computation latency. The memory recurrency edge from I6 to I1 makes the recMinII 10 cycles, which forces the lower bound of II greater than the path length from acyclic scheduling. Therefore, it is not beneficial to modulo schedule this loop in the presence of these memory recurrence edges.

Figure 3:
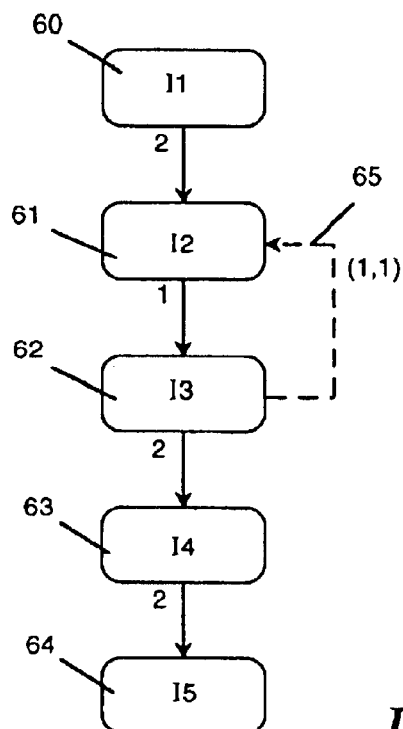
FIG. 3 is a diagram illustrating an MS graph.
Figure 4:
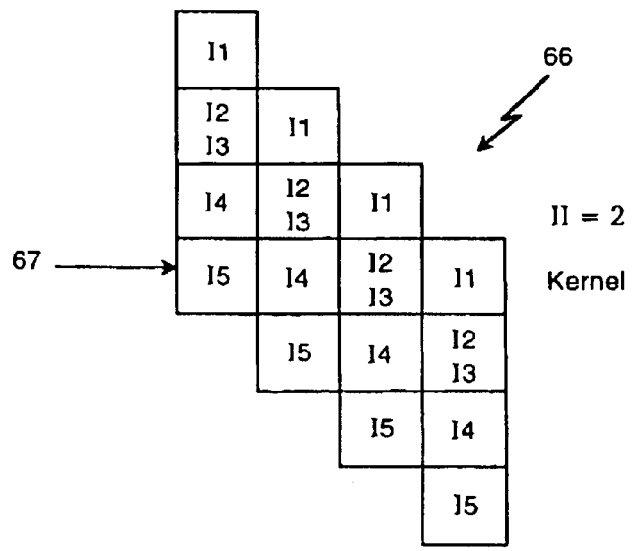
FIG. 4 is a diagram illustrating stages for a modulo scheduled loop.

FIG. 3 illustrates an MS graph with instructions I1 (60), I2 (61), I3 (62), I4 (63), and I5 (64). Assuming a 4-issue machine, the lower bound of I1, I2, is dominated by the recurrence edge from I3 to I2 (65), which means that the I2 from the next iteration has to be scheduled at least one cycle after the I3 in the current iteration. Assume that the system finds a schedule (66) as shown in FIG. 4 for II=2. The shaded area (67) shows the kernel code, which is the execution at steady state. A modulo reservation table is typically used to track the resource usage based on the modulo scheduled time for each instruction. Each iteration is divided into k stages, where k is the path length of the instructions in the iteration divided by II. The instructions in the same stage are guarded by the same rotating predicate to allow for the generation of compact "kernel-only" code, as illustrated in Table 2. Note that for this same example, if the recurrence edge is a memory dependence edge that can be relaxed by data speculation, the II for the loop may be reduced to 1.

TABLE 2

| cycle 1 | (p2) | I2 |
| cycle 1 | (p1) | I1 |
| cycle 2 | (p4) | I5 |
| cycle 2 | (p3) | I4 |
| cycle 2 | (p2) | I3 |

Overview of Data Speculation in Acyclic Scheduling

During a DAG construction phase, a data speculative edge is added from a store to a succeeding aliasing load after deriving that the aliasing probability is small. The scheduling phase decides based on its heuristics whether a load is a candidate for speculation and if so inserts a BRDV instruction. This BRDV insertion phase has to ensure that all of the instructions to be speculated later are always recoverable. The set of speculated instructions which are originated at one LDS and terminated at the corresponding BRDV form a speculative chain. One example of maintaining the recoverability of a speculative chain is to preserve the values in the registers used by but not defined on the speculative chain, so that the registers contain valid values upon entering a recovery block. After a DAG is scheduled, a recovery code generation phase which is detached from the core scheduling phase generates a recovery block for each BRDV. The main task is to identify the speculative chain originated at the corresponding speculative load as the core scheduling phase does not track what instructions have been speculated. Flow and output dependence edges and pre-sorted topological instruction numbers are used to detect whether an instruction depending on the load is on the speculative chain or not. A dependent instruction due to a flow or output dependence is on the speculative chain if it is scheduled (or to be executed) before the BRDV. Once a speculative chain is identified, the entire chain is duplicated to a disconnected recovery block with an ending branch back to the instruction following the BRDV in the normal instruction stream. Because a recovery block is disconnected from the main control flow graph (CFG), coloring the virtual registers in recovery blocks becomes non-trivial. To simplify this task, the system creates two aggregate sets: modified-by and used-by, at each BRDV instruction to summarize the registers being defined and used in the corresponding recovery block. The data flow liveness analysis and interference graph construction phases operate solely on the main CFG and can then build a correct interference graph for registers defined or used in recovery blocks. The whole register assignment phase requires minimal changes due to the introduction of recovery blocks. These BRDV aggregates also prevent a post-register allocation scheduling or any other down-stream phase from changing the speculative chains. Thus, recovery blocks can remain consistent with their speculative chains.

TABLE 3

| st [d] = u | // I1 | lds x = [a] | // I2 | Rec: | ld x = [a] | // I2' |
| Id x = [a] | // I2 | add y = x, b | // I3 | | add y = x, b | // I3' |
| add y = x, b | // I3 | add = y | // I4 | | add = y | // I4' |
| add = y | // I4 | add y = if p | // I5 | | add y = if p | // I5' |
| add y = if p | // I5 | st [d] = u | // I1 | | br Cont | // I8 |
| add b = y | // I6 | brdv x, Rec | // I7 | | | |
| | | Cont: add b = y | // I6 | | | |

(a) before data speculation
(b) after data speculation with recovery code

Table 3 shows an example which has a data speculation opportunity. During the DAG construction phase, a data speculative edge is added from the store (I1) to a subsequent aliasing load (I2). Assuming that the acyclic scheduling phase sees beneficial to schedule the load early to overlap its dependent executions with the store and potentially other computations, in Table 3 the load along with three dependent instructions (I3, I4, and I5) is advanced across the store and is converted to an LDS. A BRDV instruction (I7) is inserted after the store, and at run time if the disambiguation mechanism detects that store is aliased with the LDS, the BRDV will branch to execute the recovery block (Rec) to recover from the mis-speculation. The recovery code generation phase identifies that instructions I2, I3, I4, and I5 form the speculative chain, where I3 and I4 are included because they are flow-dependent on the originating LDS (I2), and I5 is included because it is output-dependent on I3. The instructions on the speculative chain are duplicated into recovery block Rec, and the LDS is converted back as a regular load (I2'). Note that the system does not allow instruction I6 on the speculative chain, because it would have overwritten register b, which contains a value consumed until I3 and to be preserved till I3' in the recovery block. The BRDV insertion phase detects this case and adds a dependence edge from the BRDV to I6 to exclude the possibility of speculating I6.

Therefore, compiler frameworks can provide modulo scheduling and data speculation in acyclic scheduling. An embodiment consistent with the present invention extends and integrates these frameworks to enable data speculation in modulo scheduled loops, which shares all of the issues of doing that in acyclic scheduling.

Figure 5:
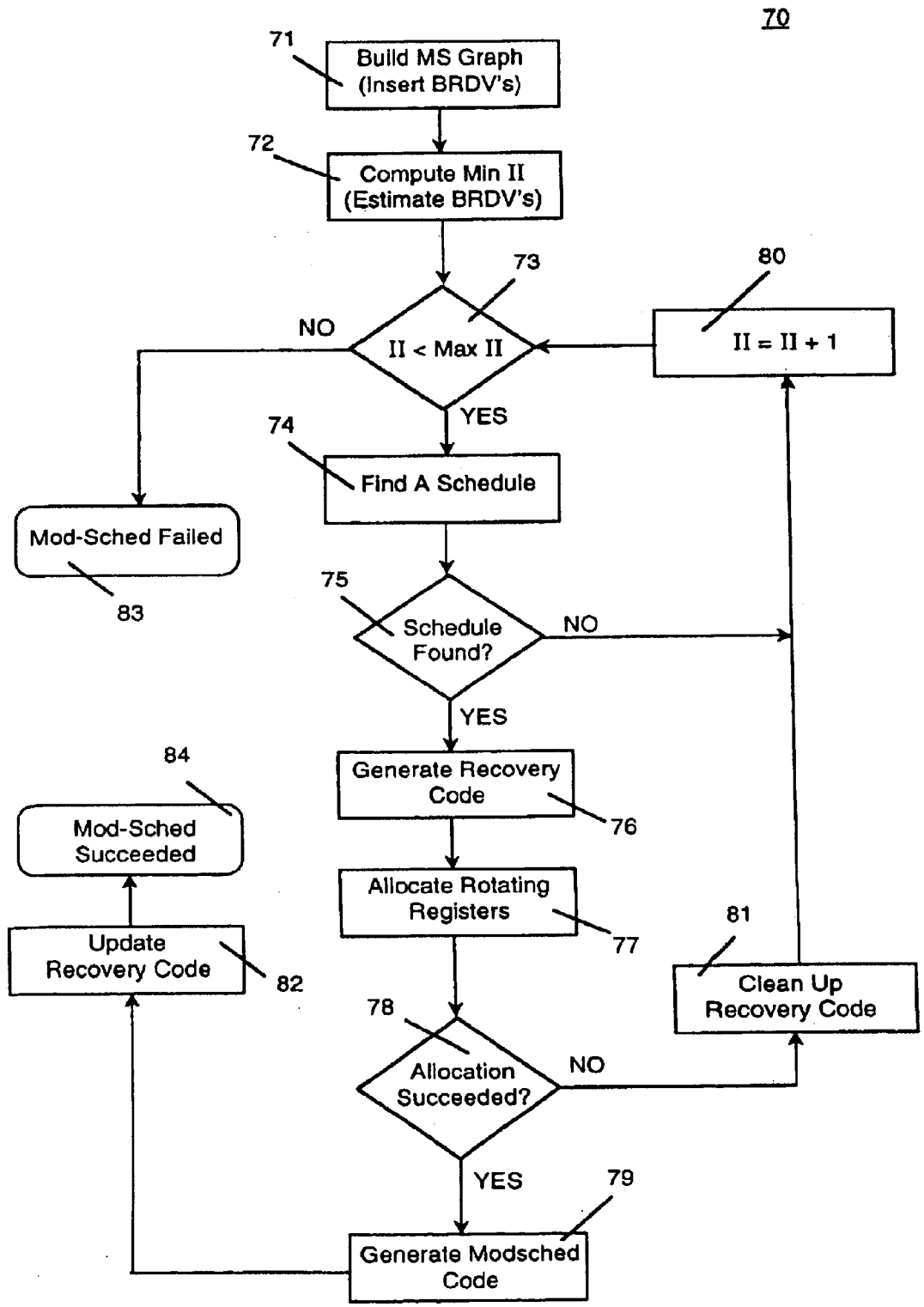
FIG. 5 is a flow chart illustrating relative phase ordering in modulo scheduling.

Enabling Data Speculation in Modulo Scheduling Extended Modulo Scheduling Framework From the scheduling point of view a BRDV instruction consumes a memory, functional unit and has dependencies on other instructions in the loop. Therefore, it is important that the number of BRDV's for a modulo scheduled loop is factored into the minimal II computation and be part of the modulo scheduling graph (MS graph). From the recovery code generation perspective BRDV's are not treated as branches, such that allowing reentry into the kernel is a requirement. The earliest point at which speculative chains can be identified and recovery code can be generated is after a schedule has been obtained for a particular II. However, this implies that recovery code needs to be updated after rotating register allocation and assignment, provided a successful allocation is obtained. An alternative is to postpone recovery codegen until modulo scheduling code generation. But in that case the rotating register allocator needs to be cognizant of recovery code which is yet to be generated. Therefore, it is desirable to generate recovery code as soon as a schedule has been determined (similar to the recovery code generation framework in acyclic scheduling) and patch it up for downstream changes such as register allocation effects. If register allocation fails the recovery code is discarded and a fresh attempt at scheduling is made for a higher II. From experience, it is worthy to note that it is rarely the case that we fail register allocation once a schedule has been found. FIG. 5 illustrates the phase ordering 70 of related phases within the extended modulo scheduler to enable data speculation.

In phase ordering 70, the scheduler performs the following steps. The scheduler builds an MS graph (step 71) and computes min II (step 72). It determines if II is less than the maximum II (step 73); if not, the mod-sched failed (step 83). Otherwise, if II is less than the maximum II, the scheduler attempts to find a schedule (step 74). If it did not find a schedule, the scheduler updates II to II+1 (step 80) and returns to step 73. Otherwise, if the scheduler finds a schedule (step 75), it generates the recovery code (step 76) and attempts to allocate rotating registers (step 77). If the allocation did not succeed (step 78), the scheduler cleans up the recovery code (step 81), repeats step 80, and returns to step 73. Otherwise, if the allocation succeeded, the scheduler generates modsched code (step 79) and updates the recovery code (step 82) for the successful mod-sched (step 84).

Inserting BRDV's

In addition to the data speculations introduced by acyclic scheduling, BRDV's for other LDS candidates, in particular those arisen due to recurrence memory dependence edges, seen by the modulo scheduler in a loop body, are inserted during MS graph building process. They are inserted both into the DAG (or more precisely MS graph) and the instruction stream. However, they are not committed to the instruction stream yet and may get removed by subsequent processes if they are not utilized. They may not get utilized for several reasons; during BRDV estimation we may decide that it is not necessary, or during scheduling we may decide not to speculate the corresponding load and if this happens we remove the redundant BRDV's at the end of modulo scheduling code generation phase. The system can also remove BRDV's in a cleanup phase in the event that a schedule is not found. In all these cases the system handles only BRDV's that are inserted by modulo scheduler and those generated by the acyclic scheduler, are left alone.

For every load that is considered a speculation candidate the system inserts a BRDV and mark it dependent on the load. The system also sets up dependencies from the BRDV to successors of the load which may not be speculated as in the acyclic scheduling case. In addition, the system sets up dependencies between the BRDV and the loop control compare. Table 4 provides pseudo code for an exemplary algorithm used to generate dependencies between BRDV instructions and instructions on the speculative chain to allow full recovery.

TABLE 4

```
// Collect set of successor's to the root node
// Collect the live-in resources to the speculative load.
for each successor of root node
{
    // If the succNode already depends on the BRDV, mark all of its
    // successors also dependent on the BRDV. This allows us to later
    // quickly pass thru them.
    compute list scheduling dependency
    if successor is a system instruction establish a dependence
    if successor has side effects such as fp state manipulation establish
    dependence for each resource the successor defines, establish
    dependence
    {
        if it is anything but a gr, fr or pr.
        if is the same resource as the load target.
        if defined resource is not in SSA form.
        if defined resource is not renamable in modsched loop
        if it is a resource live into the speculative chain.
```

TABLE 4-continued

```
    }
    If the successor is an unsafe load, it needs to be made speculative.
    For a modsched while loop candidate, loop control cmps should not
    enter speculative chain more than once.
    If the successor is already scheduled or is a candidate, don't
    establish a dependence.
    if there's a dependence
    {
        Build a dependence edge with "latency".
        if it is an exposed use in a modsched loop set the omega value
        to be 1.
        For a modsched while loop candidate, loop control cmps
        should not enter speculative chain more than once. Set omega
        value to 1.
        // Stop searching any successors of succNode for dependency
        // only if maxLatency has been met and the edge is not specula-
        // tive. If the succNode already depends on the BRDV, mark all
        // of its successors also dependent on the BRDV. This allows us
        // to later quickly pass thru them.
        update live-in resources to the speculative chain
    }
}
```

Figure 6:
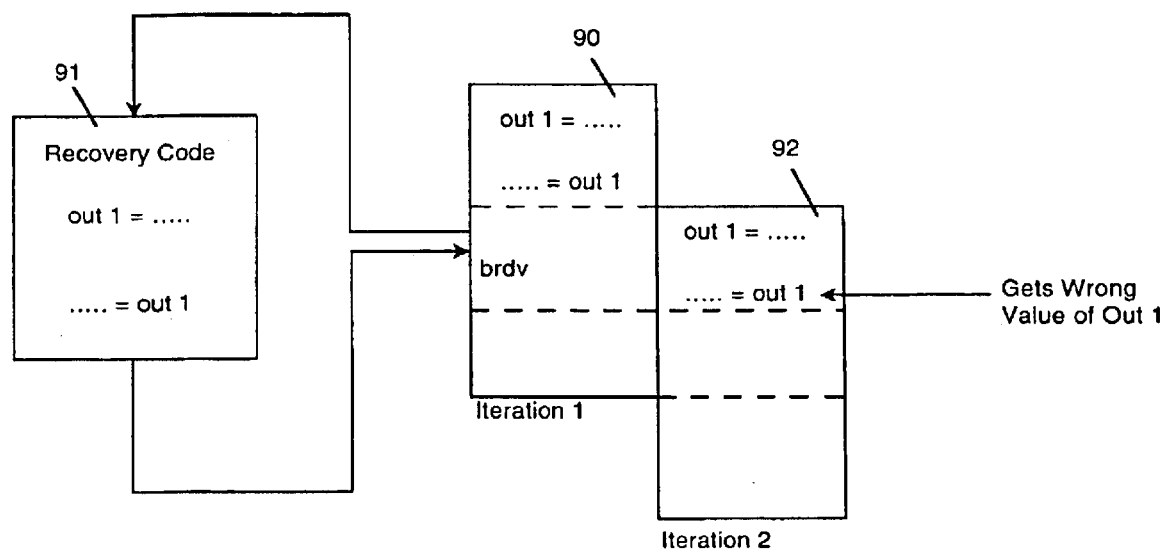
FIG. 6 is a diagram illustrating special treatment of non-renamable registers.

A special case exists where the system needs to give a different treatment in the modulo scheduler in order to allow for correct recovery code generation. Consider the example in FIG. 6 where the system has a speculative chain with a lifetime involving the use of a register which will not get renamed, and thus cannot be allocated to a rotating register. There are a number of causes for nonrenamable registers in practice. In this case, register out1 (90) is non-renamable due to calling convention, and it is used to pass an argument to a callee. If the BRDV fails and the system enters recovery code (91), the value of out1 defined for the second iteration (92) will be destroyed by the definition to recover the value for the first iteration (90), and the use of out1 in the second iteration (92) will not receive the correct value when the system re-enters the kernel. In the acyclic scheduling case, the recovery code generation phase can examine all instances of the instructions on a speculative chain and will rematerialize the new value of out1 in a recovery block before branching back to main stream code. However, in the case of the modulo scheduler to rematerialize the value before re-entering the kernel, the recovery code generation phase has to keep track of how many definitions from the same instruction but different iterations in flight. Although it is possible, this further complicates recovery code generation because the defining instructions are not explicit in the code stream as in straightline code. To avoid this complexity the system draws a recurrence dependence edge with an omega value of 1 from the BRDV to definitions of registers in the speculative chain which are not renamable. Note that this complexity does not arise as long as registers whose lifetimes greater than II can be allocated to rotating registers to expand different versions of the same definition.

Estimating BRDV's

As mentioned above, BRDV's are inserted into the code stream and the DAG, during the MS graph building process. At this point the system is not certain whether a BRDV instruction would be required, meaning the corresponding load would be issued speculatively. Therefore, certain heuristics are used to determine whether a load would be speculated and a corresponding BRDV will need to be inserted. This process ties into the minimum II computation algorithm. and in particular the RecMinII computation. First, the ResMinII is computed with all the BRDV's inserted assuming all instructions that can speculate will speculate. Next, the strongly connected components (SCC's) are identified and divided into the simple and the complex ones. The simple SCC would have only a single cycle and therefore the RecMII can be computed by adding up the latencies on the edges and dividing by the sum of the distances. The complex SCC on the other hand has more than one cycle and therefore requires a more elaborate algorithm such as the one for computing the minimum permissible time interval (MinDist) between every pair of operations in the SCC. If the SCC contains any LDS (and BRDV) the system then recomputes the RecMinII for the SCC assuming that none of these loads are speculative, meaning no BRDV's are present. In the case of the complex SCC, once again the system uses the MinDist algorithm instead of computing the RecMinII. A simple SCC may turn into a complex one once speculative loads are made non-speculative due to additional cross-iteration edges. In either case, if the new RecMinII is no greater than the old RecMinII then the system leaves the relevant loads non-speculative and removes corresponding BRDV's both from the MS graph and the code stream. Otherwise, the BRDV's remain for now. Table 5 shows this algorithm.

Scheduling BRDVs

During scheduling, the heuristics for selecting a node are biased towards delaying the selection of a BRDV instruction until such time when the system knows with certainty whether the BRDV is needed or not. The system knows whether a BRDV would be needed or not if the corresponding LDS instruction has been scheduled. If the scheduler uses the Iterative Moduler Scheduling Algorithm, it is useful to unschedule the corresponding BRDV when a speculative LDS gets unscheduled. Also, since BRDVs themselves cannot be speculated the system attempts to delay their scheduling until such time when it knows how many speculative stages it has. For while loops, this amounts to delaying the scheduling of BRDVs until the loop control compare instruction is scheduled. Once the compare is scheduled the system attempts to accelerate the scheduling of instructions that cannot be speculated such as BRDVs. However the first heuristic receives higher priority.

TABLE 5

```
minII = compute resMII with checks
for each SCC in the modsched graph
{
    if SCC is simple then
    {
    recMII₁ = compute recurrence MII with checks
    minII = max(minII, recMII₁)
    if SCC has speculative loads
    {
        rebuild SCC assuming loads are non-speculative
        if SCC is simple
        {
            recMII2 = compute recurrence MII without checks
            if recMII2 <= recMII1
                remove checks from dag and code stream.
                add non-speculative edges to loads
        }
        // otherwise leave the checks be
    }
    else H SCC is complex
    {
        satisfies = recMII₁ satisfies recurrence constraints
        if satisfies == TRUE
        {
            remove checks from dag and code stream
            add non-speculative edges to loads
        }
        // otherwise leave the checks be
    }
}
}
else // SCC is complex
    while minII does not satisfy recurrence constraint
        minII = minII + 1 // up to maxII
    if SCC has speculative loads
    {
```

TABLE 5-continued

```
        rebuild SCC assuming loads are non-speculative
        satisfies = minII satisfies recurrence constraints
        if satisfies == TRUE
        {
            remove checks from dag and code stream
            add non-speculative edges to loads
        }
        // otherwise leave the checks be
    }
}
```

Recovery Code Generation

Although the recovery code generation framework in acyclic scheduling provides a solid base, that framework is extended for modulo scheduling to tackle at least two issues. First, the topological ordering of instructions may not reflect the data flow of actual execution of instructions on a speculative chain. Second, an instruction may be executed more than once during the lifetime of a speculative chain. Note that these two problems are unique to modulo scheduling and do not appear in acyclic scheduling. The following examples illustrate these two issues.

Table 6 contains an example which shows the issue of unmatched static and dynamic instruction ordering. The load is speculated from the next iteration across the store. The unroll time is the scheduling time for each instruction in a loop body without folding the time with a modulo of II The time is shown as (cycle, slot), where cycle is the scheduling cycle and slot indicates the sequence in the given cycle. Note that the use of x in instruction I1 is an upward exposed use. The static instruction ordering is shown as I1, I2, and I3. However, the actual execution sequence in terms of the speculative chain starting at the LDS is I2, I3, and I1, where this I1 is from the next iteration and has the execution time at (5,0), and this is the code sequence that ought to be generated in the recovery code. Table 7 contains an example, in which an instruction is included more than once in a speculative chain. Because instruction I3 uses the value of x defined by the LDS, it is included on the speculative chain. The value in y flows across the loop back edge into instruction I1 in the next iteration, but then the target of I1, z, feeds into I3. This results in including I3 on the speculative chain again, but this I3 is from the next iteration.

TABLE 6

| unroll time (cycle, slot) | | | | | | |
|---|---|---|---|---|---|---|
| (0,0) | II = 5 | add y = x, c | // I1 | Rec: | 1d x = [a] | // I2' |
| (2,0) | | 1ds x = [a] | // I2 | | add z = x, b | // I3' |
| (4,0) | stage 0 | add z = x, b | // I3 | | add y = x, c | // I1' |
| (4,1) | | st [d] = e | // I4 | | br Cont | // I8 |
| (5,1) | stage 1 | brdv x, Rec | // I5 | | | |
| | | Cont: . . . | | | | |

TABLE 7

| add z = y, a | // I1 | Rec: | 1d x = [b] | // I2' iteration 0 |
|---|---|---|---|---|
| 1ds x = [b] | // I2 | | add y = x, z | // I3' iteration 0 |
| add y = x, z | // I3 | | add z = y, a | // I1' iteration 1 |
| . . . | | | add y = x, z | // I3" iteration 1 |
| brdv x, Rec | // I4 | | br Cont | |
| Cont: | | | | |

To resolve these two issues, the system introduces two more notions into the recovery code generation phase. Since an instruction may be encountered more than once due to the instances from different iterations, the system introduces the notion of a version for each instruction to represent the instance in each iteration. The number of versions that need be considered for each instruction is bound by the number of stages of the loop body. To determine the execution sequence based on the data flow on a speculative chain, the system tracks the execution time of each version of an instruction with respect to the beginning of the loop body.

Table 8 provides an algorithm for function ModSchedRecCodeGen, which identifies the speculative chain originating at theLDS and terminated at theBRDV in a modulo scheduled loop represented as MSGraph and generates the recovery code. It calls function IdentiftFlowOutputSuccOnSpecChain to identify the successors of theLDS version 0 due to flow and output dependencies. For the given instruction, Inst, with version i in function IdentifyFlowOutputSuccOnSpecChain, its execution time is equal to the unroll time of Inst plus II multiplying i. If the execution time is greater than the unroll time of theBRDV, Inst.Ver[i] is not on the speculative chain. Otherwise, the system calls function DuplicateSpecInstToRecoveryBlock to add it to the recovery block and mark it being processed. The system follows each flow or output dependence edge from Inst to locate a successor as these edges are all included in MSGraph. If this edge is a recurrence edge, the system calculates the version number of the successor by adding i with the omega value on the edge. Otherwise, the successor is in the same iteration i. If the successor has not been processed before, the system recursively calls function IdentifyFlowOutputSuccOnSpec-Chain to identify other succeeding speculated instructions. Function DuplicateSpecInstTo-RecoveryBlock duplicates speculated instruction SpecInst with version i as RecInst. The system also copies the execution time from SpecInst.Ver[i] to RecInst, which is used in rotating register allocation assignment. RecInst is inserted into recovery block RecBlock at a position based on its execution time.

TABLE 8

ModSchedRecCodeGen(theLDS, theBRDV, 11, MSGraph)
{
    RecBlock = the recovery block for theBRDV;
    IdentifyFlowOutputSuccOnSpecChain(theLDS, 0, theBRDV, II, MSGraph, RecBlock);
}
IdentifyFlowOutputSuccOnSpecChain(Inst, i, theBRDV, II, MSGraph, RecBlock)
{
    Inst.Ver[i].ExecTime = Inst.UnrollTime + II * i;
    // If not on the speculative chain, return.
    if(Inst.Ver[i].ExecTime>theBRDV.UnrollTime) return;
    DuplicateSpecInstToRecoveryBlock(Inst, i, RecBlock);
    Mark Inst.Ver[i] been processed;
    for every outgoing flow or output dependence edge of Inst in MSGraph {
        theEdge = the current outgoing dependence edge;
        theSuccInst = the destination instruction of theEdge;
        if( theEdge is a recurrence edge) {
            // theSuccInst is in a successive iteration.
            theSuccInstIter = i + theEdge.OmegaValue;
        }else {
            // theSuccInst is also in iteration i.
            theSuccInstIter = i;
        }
        if( theSuccInst has not been processed) {
            IdentifyFlowOutputSuccOnSpecChain(theSuccInst, theSuccInstIter, theBRDV, II, MSGraph, RecBlock);
        }
    }
}
DuplicateSpecInstToRecoveryBlock(SpecInst, i, RecBlock)
{
    RecInst = a duplicate of SpecInst;
    if( RecInst is a LDS) make RecInst a regular load;
    RecInst.ExecTime = SpecInst.Ver[i].ExecTime;

TABLE 8-continued

Insert RecInst into recovery block RecBlock at the proper position based on RecInst.ExecTime;
}

During the extension of recovery code generation for modulo scheduled loops, another issue is encountered, in which a register is both read and written (or updated) on a speculative chain. Normally, an instruction referring to such a register is excluding from a speculative chain by adding an edge from the corresponding BRDV during the DAG or MS graph construction time, because it may destroy a value live-in to the speculative chain and hamper recoverability. A large source of updating registers is from the increments of base registers in post-increment loads. If wanting to avoid all updating registers in speculative chains, the system would have to exclude all post-increment loads from being data speculation candidates, which is undesirable for high performance execution. Furthermore, due to phase ordering, post-increment, load candidates are shown in a pseudo form with an address of an offset plus a pointer base during DAG construction and do not have any register in an update form. This pseudo form intends to give a later post-increment synthesis phase the flexibility to decide which loads to be actually converted to post-increment loads and which loads to share the same base registers after scheduling is done.

This issue can better be illustrated using the example in Table 9. During scheduling and recovery code generation, post-increment loads are still represented in their pseudo form as shown in Table 9 (section (a)), and hence the post-increment load in a recovery code is also in its pseudo form. Because of the nature of update, an updating register has to refer to the same physical register in all iterations and cannot be allocated to a rotating register. As a result, the span of all instances of the same updating register has to be within a distance of II, and the generation of post-increment loads follows this restriction. Table 9 (section (b)) shows the code after post-increment loads are generated. However, the I1' in the recovery block cannot simply be converted to 1d x=[b], a1 as its counter part in the loop body, because the base register b has been post-incremented not only by I1. Ver[0] in an amount of a1 but also by I2.Ver[0] in a further amount of a2 in the loop body. It is non-trivial to restore the base address in I1.Ver[0] for the load in recovery block. Subtracting the b in block Rec with the amount of a1 and a2 is insufficient, because as Table 9 shows this b may have also been incremented by subsequent versions of I1 and I2 from next iterations. This adjustment is further complicated by when the BRDV appears in epilog code or ramping down stages, in which those post-increment instructions may be predicated off by stage rotating predicates. Therefore, the adjustment instructions in block Rec for different versions of related postincrement instructions need to be guarded by proper stage predicates as shown in Table 9 (section (c)). The sequence of adjustment instructions can certainly be optimized using some well-known techniques, such as height reduction and peephole optimization, but it is more clear what adjustments need to be made as they stand.

TABLE 9 unroll time
| | | | | |
|---|---|---|---|---|
| (0,3) | II = 6 | 1ds x = d0(p) // I1 | Rec: | Id x = d0(p)  // I1' |
| (1,3) | | 1d y = d1(p) // I2 | | ... |
| ... | | ... | | |
| (17,2) | | brdv x, Rec | | |

(a) Recovery code before generating post-incrementing loads.
execution time   iteration i    iteration i+1   iteration i+2

TABLE 9-continued

```
(0,0)    ---- stage 0 (stage predicate = P_k-2 ----
(0,3)         1ds x = [b], a1 // I1.Ver[0]
(1,3)         1d y = [b], a2 // I2.Ver[0]
...
(6,0)    ---- stage 1 (stage predicate = P_{k-1})
(6,3)                   1ds x = [b], a1 // I1.Ver[1]
(7,3)                   1d y = [b], a2 // I2.Ver[1]
(12,0)   ---- stage 2 (stage predicate = P_k) ----
(12,3)                            1ds x = [b], a1 // I1. Ver[2]
(13,3)                            1d y = [b], a2 // I2.Ver[2]
...
(17,2)   brdv x, Rec
(b) Execution times of different versions of instructions after generating
post-Incrementing loads.
Rec:     sub c = b, a1
         sub c = c, a2
         sub c = c, a1 if P_{k-1}
         sub c = c, a2 if P_{k-1}
         sub c = c, a1 if P_{k-2}
         sub c = c, a2 if P_{k-2}
         Id x = [c]
         ...
(c) Adjust recovery code for the post-incremented amount.
```

Table 10 lists function RecCodeGenAdjustInstsForUpdateReg, which generates the necessary adjustment code in recovery block for an updating register UpdateReg on the speculative chain associated with theBRDV. Instruction SpecInst is the speculated instruction that updates register UpdateReg, and instruction UpdateInst is the duplicated recovery instruction in block RecBlock. The system first generate a temporary register, TempReg, which initially contains the value of UpdateReg at the time entering RecBlock. $P_k$ is the stage predicate which guards the instructions in the stage containing the BRDV. The system then finds every instruction in the loop body which updates UpdateReg, and for every such instruction it checks whether it has any version whose execution time falls in between the unroll times of SpecInst and theBRDV, meaning this version affecting the value in UpdateReg between SpecInst and UpdateInst. For every such version of an instruction, an adjustment instruction is generated and inserted before UpdateInst. The adjustment instruction is guarded by a proper stage predicate to be nullified while ramping down in epilog code, if the associated instruction in the loop body is not qualified by a predicate generated by if-conversion. Otherwise, the qualifying predicate is copied to the adjustment instruction and colored by a later register assignment phase with a possibly extended lifetime.

TABLE 10

```
RecCodeGenAdjustInstsForUpdateReg(SpecInst, UpdateInst, UpdateReg,
theBRDV, II, RecBlock, MSGraph)
{
    Create a temporary register TempReg;
    // This copy instruction can be trivially optimized away, but it
    simplifies the discussion.
    Create a new instruction, mov TempReg = UpdateReg, and insert it
    before UpdateInst
in     RecBlock;
    Replace UpdateReg with TempReg in UpdateInst;
    P_k = the stage rotating predicate of the stage containing theBRDV; //
    P_k guards the instructions in this stage in the kernel
    for every instruction in MSGraph which updates UpdateReg
        Inst = the current instruction which updates UpdateReg;
        for( i = 0; i < the number of stages in MSGraph; ++i ) {
            theExecTime = Inst.UnrollTime + II * i;
            if(theExecTime<SpecInst.UnrollTime) continue;
            if(theExecTime<theBRDV.UnrollTime) {
                Inc = the increment amount for UpdateReg in Inst;
```

TABLE 10-continued

```
                qp = the qualifying predicate of Inst;
                if( qp is not True) {
                    // If qp is a predicate generated by if-conversion,
                        simply guard the adjustment instruction
                        usingqp,
                    // which is left to be colored by a later register
                        phase.
                    Generate an instruction, sub TempReg = TempReg,
                        Inc if qp, and insert it before UpdateInst;
                }else{
                    // When i = 0, P_1= P_k, which is always True
                        when reaching RecBlock.
                    Generate an instruction, sub TempReg = TempReg,
                    Inc if P_{k-i},
                                insert it before UpdateInst;
                }
            } else {
                // Inst.Ver[i] is beyond theBRDV.
                break;
            }
        }
}
```

Rotating Register Allocation and Assignment

Rotating register allocation takes place after a modulo schedule has been found and recovery code has been generated for all BRDV instructions. Allocating registers in recovery code involves modifying lifetime calculation to account for live-in values to the speculative chain, and extending rotating register assignment BRDV for speculative chains spanning loop iterations.

Extending Lifetimes Participating in Speculative Chains

Rotating register lifetime calculation is modified to extend liveness of registers to the BRDV which are needed to recover the speculative chain. This is done by reference to the def-use summary information for the recovery block which is kept with a BRDV. Registers marked as live into recovery code are tracked as uses at the point of the BRDV. Registers marked as modified in recovery code constitute may-definitions; as with predicated definitions not involved in recovery code, the system tracks these references as uses for the purpose of computing rotating register assignment.

Rotating registers are allocated to registers in recovery code based on lifetime span as adjusted for BRDV def-use summary information. Lifetimes in recovery code which have span less than II or are local to recovery code do not require rotating registers and are left to be colored by the global register allocation phase which comes after modulo scheduling. Coloring registers in recovery blocks by global register allocation has been addressed by the prior work for speculation in acyclic scheduling.

The example in Table 11 illustrates register renaming necessitated by liveness into recovery code. Without considering recovery code, x has a lifetime >II and y has a lifetime <II. A use of y appears on the speculative chain which originates at the LD.A, and is reflected by a use of y on the BRDV aggregate causing y's lifetime to extend to the second stage. As this lifetime is now larger than II, y is automatically assigned a rotating register to avoid violating an output dependence between the definitions of y from successive iterations ($y_0$ and $y_1$).

TABLE 11

| | iteration i | iteration i+1 |
|---|---|---|
| X Y | --- stage 1 --- | |
| \| | Id.a x = | |
| \| \| | add y = // $y_0$ | |

TABLE 11-continued

```
||     . . .
||     add = x, y    // y₀
||     --- stage 2 ---
||                 Id.a x =              Rec:
||                 add y =      // y₁    Id x =
||     BRDV x, Rec                       add = x, y //y₀
||                                       add = x, y //y₁
```

Register A Rotation in Recovery Code

Rotating register assignment for recovery code begins with the rotating register assignment for kernel code, which does not take recovery code into account except for the lifetime adjustment discussed above. Following register allocation for software pipelined loops, the kernel lifetimes are bin-packed and assigned locations, which are rotation-independent register bases for the lifetimes. A lifetime that begins with a definition of register r34 in stage 2 of the pipeline is accessed as r35 in stage 3, r36 in stage 4, etc. and corresponds to location 32. In general the register name to use is a function of the location of the lifetime and the stage of the reference as R[location+stage].

It is possible for a speculative chain to span multiple loop iterations. For example, a cascaded sequence of upwards-exposed uses can carry a speculated value around multiple iterations via code such as "d=c; c=b; b=a . . . . The number of loop iterations spanned by this process is bounded above by the number of stages in unrolled time from the LD.A to the BRDV. A speculative chain that spans multiple iterations presents a new consideration for rotating register assignment. The kernel register assignment was based on register rotation occurring after each pipeline stage, whereas recovery code executes with the software pipeline suspended at the BRDV. Register names must be adjusted on a recovery instruction to compensate for missing rotations implied by the version of the corresponding instruction on the speculative chain. The register name for a recovery instruction is R[location+BRDV stage-version].

A way to envision this process is to first imagine the loop branch instruction included in the speculative chain, then adjust register names accordingly. For example, if recovery code with these fictitious branches initially appears as shown in Table 12.

TABLE 12

| ld      | r32 = [r9] | # r9 is a non-rotating register     |
|---------|------------|-------------------------------------|
| br.ctop | loop       | # increment all preceding register names |
| mov     | r34 = r33  |                                     |
| br.ctop | loop       | # increment all preceding register names |
| mov     | r36 = r35  |                                     |
| br      | kernel     |                                     |

Figure 7:
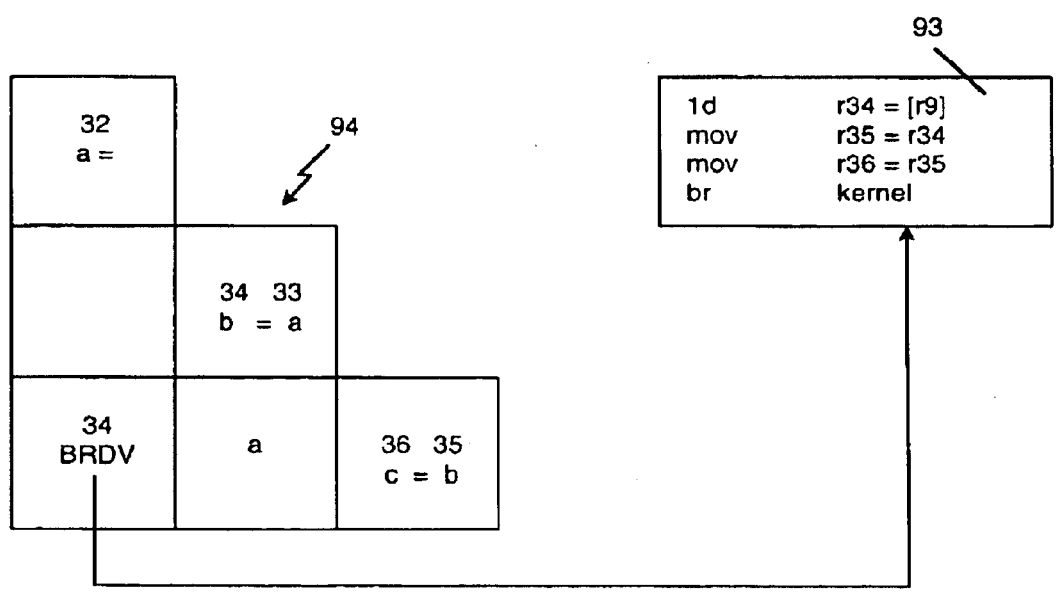
FIG. 7 is a diagram illustrating an algorithm to assign rotating registers in a recovery block.

By interpreting the register remapping effect of brctop the system obtains the register assignments as illustrated in FIG. 7 and Table 13.

TABLE 13

```
for each BRDV instruction in a modulo scheduled kernel
    for each virtualregister VR in BRDV summary aggregates
        life = VR.lifetime;
        if (life does not exist) continue, rotating register not, needed
        for each reference REF to VR in recovery code
            recovInst = recovery instruction containing REF
            version = the version of the speculated instruction
                corresponding to recovInst
            reg = life.location + BRDV.stage – version
            Color VR at REF with the physical rotating register, reg
        endfor
```

TABLE 13-continued

```
    endfor
endfor
```

Figure 8:
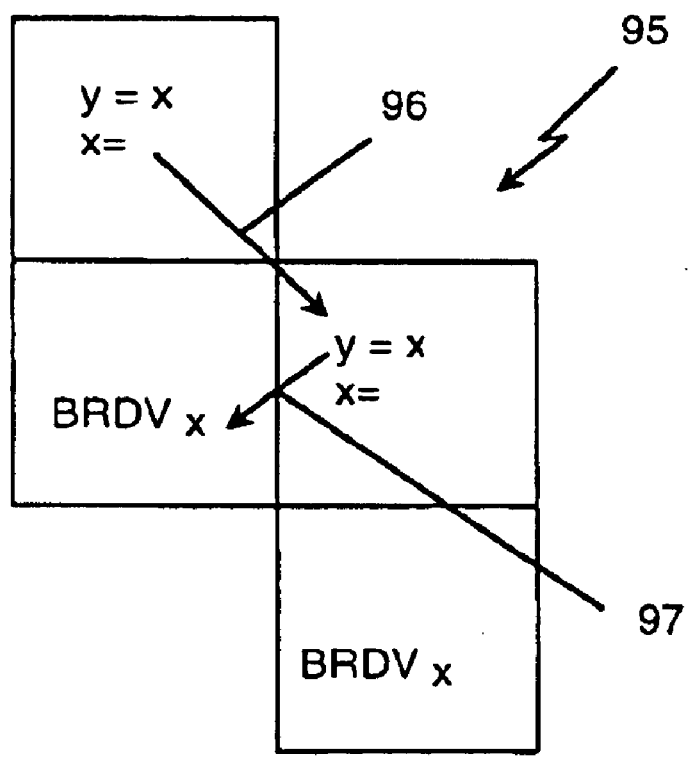
FIG. 8 is a diagram illustrating an example of rotating register assignment.

Table 13, along with FIG. 7, shows an algorithm (93) to assign rotating registers in a recovery block (94). Table 14, along with FIG. 8, show a register allocation example showing both kernel and recovery code. The speculative chain starting at instruction I1 consists of I1, I2, and I3, where I1 and I2 are from the same iteration with version 0 and I3 are from the next iteration version 1. FIG. 8 illustrates the adjustment 96 and 97 to the register name for y in recovery code 95.

TABLE 14

| | | | version | | |
|---|---|---|---|---|---|
| $(P_{k+1})$add | $R_m = R_{n+1}, \ldots$ | // I3 | | Rec: | |
| $(P_{k+2})$BRVD | $R_{n+1}$, Rec | | 0 | ID | $R_{n+1,} = [R_{m+1,}]$ // I1' |
| Cont: | | | 0 | add | $R_{j+1,} = [R_{n+1,}]$ // I2' |
| $(P_{k+1})$Id.a | $R_n, = [R_{m+1,}]$ | // I1' | 1 | add | $[R_m = R_{n1}, \ldots$ // I3' |
| $(P_{k+2})$cmp | $P_k$ q = | | | br | Cont |
| $(P_{k+1})$add | $R_j = R_{n+}, \ldots$ | // I2 | | Rec: | |
| (q) comp | $P_{k+1} =$ | | | | |
| $(P_k)$ br.wtop | | | | | |

Experimental Results

In order to evaluate the effectiveness of the technique, described above experimental data was gathered and analyzed. The target machine model assumed for these experiments is a 2 bundle wide machine with IA-64 as the underlying architecture. All operations are assured to have unit latencies irrespective of their functional units and consumer operations. At the most 6 operations can be issued per cycle (3 per bundle); out of these at the most 2 can be memory operations, 2 can be flops, and 2 can be pure integer operations. Integer ALU operations on the other hand can be issued either on a memory port or an integer port, providing at most 4 ALU operations per cycle.

Table 15 shows the increase in the number of loops modulo scheduled with data speculation. Note that each of these loops is pre-list scheduled (with data speculation applied by the list scheduler) and possibly unrolled for fractional II or other purposes prior to modulo scheduling in both columns 2 and 3. The incremental benefit measured is purely due to data speculation applied within the modulo scheduler. Even then the improvements range from 0–15%, the largest difference coming from wave5. Given the assumption of unit latencies for all operations, for some benchmarks such as hydro2d and swim no benefits are seen due to one of two reasons. First, there is little motivation to break store-load dependencies and schedule loads much earlier than consumers. Second, simple unrolling with data speculation in the list scheduler is sufficient for obtaining the best IIs for the relevant loops.

TABLE 15

| Benchmark | # loops swp no msdspec | # loops swp with msdspec | % inc |
|---|---|---|---|
| tomcatv | 3 | 3 | 0 |
| swim | 6 | 6 | 0 |
| su2cor | 18 | 22 | 11.1 |
| hydro2d | 56 | 58 | 3.6 |

TABLE 15-continued

| Benchmark | # loops swp no msdspec | # loops swp with msdspec | % inc |
|---|---|---|---|
| mgrid | 11 | 11 | 0 |
| applu | 20 | 22 | 10 |
| turb3d | 13 | 15 | 15.4 |
| apsi | 83 | 85 | 2.5 |
| fpppp | 4 | 4 | 0 |
| wave5 | 83 | 90 | 8.4 |

Table 16 shows the decrease in the IIs for some loops from the same benchmarks. Most of these loops did not become modulo scheduled without data speculation, in which case we used the maximum II, meaning the path length returned by the pre-list scheduler for comparison. A few loops were modulo scheduled under both situations (with and without data speculation) and for these the II reduced with data speculation. There were a couple of loops on which the modulo scheduler did better without data speculation because of the overhead due to BRDV/ld.s instructions. The benefits go all the way up to 50% as in turb3d. The negative effects seem to go all the way up to about 33%.

TABLE 16

| Benchmark | II with nomsdspec | II with nsdspec | % dec |
|---|---|---|---|
| su2cor | 19 | 17 | 10.5 |
|  | 19 | 16 | 15.8 |
|  | 19 | 17 | 10.5 |
|  | 19 | 16 | 15.8 |
|  | 6 | 5 | 16.7 |
|  | 6 | 4 | 33.3 |
|  | 3 | 4 | −33.3 |
|  | 3 | 4 | −33.3 |
| hydro2d | 9 | 7 | 22.2 |
|  | 9 | 7 | 22.2 |
| applu | 4 | 3 | 25 |
|  | 4 | 3 | 25 |
| turb3d | 10 | 5 | 50 |
|  | 10 | 5 | 50 |
| apsi | 7 | 4 | 42.9 |
|  | 3 | 2 | 33.3 |
| wave5 | 10 | 8 | 20 |
|  | 5 | 5 | 0 |
|  | 8 | 7 | 12.5 |
|  | 8 | 7 | 2.5 |
|  | 11 | 10 | 9.1 |
|  | 4 | 3 | 25 |
|  | 15 | 14 | 6.7 |
|  | 3 | 2 | 33.3 |

While the present invention has been described in connection with an exemplary embodiment, it will be understood that many modifications will be readily apparent to those skilled in the art, and this application is intended to cover any adaptations or variations thereof. For example, different types of computer architecture and compilers may be used without departing from the scope of the invention. This invention should be limited only by the claims and equivalents thereof.

What is claimed is:

1. A method of scheduling instructions in a compiler, comprising:
   generating a modulo schedule kernel with data speculative load (LDS) and corresponding data verify branch (BRDV) for specifying an order of execution of the instructions,
   enabling the LDS to reduce a recurrence constraint (RecMII) while avoiding an increase in a resource constraint (ResMII) from the corresponding BRDV;
   generating recovery code corresponding to each speculative chain for the data speculation code to allow for reentry into the modulo schedule kernel at runtime;
   allocating rotating registers at compilation time related to the scheduling of the instructions for execution and related to the recovery code;
   determining, an initiation interval specifying a number of instruction issue cycles between initiation of successive iterations related to the scheduling of the instructions for execution, and
   ensuring full recoverability for all speculated instructions to allow for reentry into the modulo schedule kernel.

2. The method of claim 1 further comprising determining whether the scheduling was successfully located.

3. The method of claim 2 wherein the determining step includes incrementing the initiation interval if the scheduling was not successfully located.

4. The method of claim 1 wherein the allocating step includes determining whether the rotating registers were successfully allocated.

5. The method of claim 3 wherein the determining step includes incrementing the initiation interval if the rotating registers were not successfully allocated.

6. The method of claim 1 wherein the determining step includes determining a lowest initiation interval.

7. The method of claim 1, further including generating recovery code related to the scheduling.

8. The method of claim 1 further comprising building a modulo scheduling graph for the instructions.

9. The method of claim 1 further comprising:
   building a dependence acyclic graph based upon control dependencies among the instructions; and
   scheduling the instructions for execution based upon the dependence acyclic graph.

10. The method of claim 1 wherein the determining step includes determining if the initiation interval is less than a maximum initiation interval.

11. The method of claim 1 wherein the speculative instructions span multiple loop iterations.

12. The method of claim 1 wherein the speculative instructions are speculatively executed more than once.

13. The method of claim 1 wherein the speculative instructions use and define a same rotating register.

14. An apparatus for scheduling instructions in a compiler, comprising:
   a first generate module that generates a modulo schedule kernel with data speculative load (LDS) and corresponding data verify branch (BRDV) for specifying an order of execution of the instructions, wherein the LDS is enabled to reduce a recurrence constraint (RecMII) while avoiding an increase in a resource constraint (ResMII) from the corresponding BRDV;
   a second generate module that generates recovery code corresponding to each speculative chain for the data speculation code to allow for reentry into the modulo schedule kernel at runtime;
   an allocate module that allocates rotating registers at compilation time related to the scheduling of the instructions for execution and related to the recovery code; and
   a determination module that determines an initiation interval specifying a number of instruction issue cycles between initiation of successive iterations related to the scheduling of the instructions for execution,
   wherein the apparatus ensures full recoverability for all speculated instructions to allow for reentry into the modulo schedule kernel.

15. The apparatus of claim 14 further comprising a module that determines whether the scheduling was successfully located.

16. The apparatus of claim 15 wherein the determination module includes a module that increments the initiation interval if the scheduling was not successfully located.

17. The apparatus of claim 14 wherein the allocate module includes a module that determines whether the rotating registers were successfully allocated.

18. The apparatus of claim 17 wherein the determination module includes a module that increments the initiation interval if the rotating registers were not successfully allocated.

19. The apparatus of claim 14 wherein the determination module includes a module that determines a lowest initiation interval.

20. The apparatus of claim 14, further including a module that generates recovery code related to the scheduling.

21. The apparatus of claim 14 further comprising a module that builds a modulo scheduling graph for the instructions.

22. The apparatus of claim 14 further comprising:
a module that builds a dependence acyclic graph based upon control dependencies among the instructions; and
a module that schedules the instructions for execution based upon the dependence acyclic graph.

23. The apparatus of claim 14 wherein the determination module includes a module that determines if the initiation interval is less than a maximum initiation interval.

24. The apparatus of claim 14 wherein the speculative instructions span multiple loop iterations.

25. The apparatus of claim 14 wherein the speculative instructions are speculatively executed more than once.

26. The apparatus of claim 14 wherein the speculative instructions use and define a same rotating register.

* * * * *